(12) United States Patent
Nagata et al.

(10) Patent No.: US 9,401,830 B2
(45) Date of Patent: Jul. 26, 2016

(54) CHANNEL RECONFIGURATION METHOD, PRECODING METHOD AND APPARATUS THEREFOR

(75) Inventors: Satoshi Nagata, Tokyo (JP); Jianchi Zhu, Beijing (CN); Xiaoming She, Beijing (CN); Xiang Yun, Beijing (CN); Yu Jiang, Beijing (CN); Lan Chen, Beijing (CN); Hirohito Suda, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 144 days.

(21) Appl. No.: 14/116,836

(22) PCT Filed: May 10, 2012

(86) PCT No.: PCT/JP2012/062004
§ 371 (c)(1),
(2), (4) Date: Nov. 11, 2013

(87) PCT Pub. No.: WO2012/157518
PCT Pub. Date: Nov. 22, 2012

(65) Prior Publication Data
US 2014/0064236 A1    Mar. 6, 2014

(30) Foreign Application Priority Data

May 16, 2011   (CN) .......................... 2011 1 0129623

(51) Int. Cl.
*H04L 25/03* (2006.01)
*H04B 7/04* (2006.01)
*H04L 5/00* (2006.01)
(Continued)

(52) U.S. Cl.
CPC ........ *H04L 25/03904* (2013.01); *H04B 7/0417* (2013.01); *H04B 7/0626* (2013.01); *H04B 7/0632* (2013.01); *H04L 5/0035* (2013.01); *H04L 25/0242* (2013.01); *H04L 25/03949* (2013.01); *H04L 2025/03802* (2013.01)

(58) Field of Classification Search
None
See application file for complete search history.

(56) References Cited

U.S. PATENT DOCUMENTS

2010/0265841 A1* 10/2010 Rong et al. .................... 370/252
2010/0323625 A1  12/2010 Kishigami et al.
(Continued)

FOREIGN PATENT DOCUMENTS

JP    2009-33744 A    2/2009
WO   2009/098880 A1   8/2009

OTHER PUBLICATIONS

Office Action issued in corresponding Japanese application No. 2013-515105 along with English language communication reporting the same; dated Feb. 18, 2014 (4 pages).
(Continued)

*Primary Examiner* — Noel Beharry
*Assistant Examiner* — Rodrick Mak
(74) *Attorney, Agent, or Firm* — Osha Liang LLP

(57) ABSTRACT

In order to recognize a relatively accurate channel state of each UE, a channel of the UE is reconfigured based on channel phase information and channel quality information reported from the UE to obtain a channel matrix of the UE. Besides, a channel of the UE is reconfigured based on channel phase information and channel quality information reported from the UE to obtain a channel matrix of the UE, a precoding matrix of the UE is determined based on the channel matrix of the UE, and precoding is performed on data to transmit to the UE, using the precoding matrix.

7 Claims, 5 Drawing Sheets

(51) Int. Cl.
*H04L 25/02* (2006.01)
*H04B 7/06* (2006.01)

(56) References Cited

U.S. PATENT DOCUMENTS

2011/0007685 A1* 1/2011 Ma .................. H01Q 25/00
370/315

2011/0164696 A1* 7/2011 Choi et al. ................ 375/260

OTHER PUBLICATIONS

International Search Report for corresponding International Application No. PCT/JP2012/062004, mailed Jun. 5, 2012 (1 page).
LG Electronics; "Scenario 2—Case 1 Channel Model (4 Tx);" 3GPP TSG WG RAN1 #65, R1-111302; Barcelona, Spain; May 9-13, 2011 (10 pages).

* cited by examiner

US 9,401,830 B2

CHANNEL RECONFIGURATION METHOD, PRECODING METHOD AND APPARATUS THEREFOR

TECHNICAL FIELD

The present invention relates to a radio communication technique, and particularly, to a channel reconfiguration method, a precoding method and an apparatus therefor.

BACKGROUND ART

Cellar mobile phones provide an extremely great convenience to communication of the people, and the $2^{nd}$ generation global mobile communication system (GMS: Global System for Mobile Communication) (Registered Trademark) provides further improvement of communication quality in mobile communication by adopting digital communication techniques. The $3^{rd}$ generation partnership project (3GPP) as an important organization in the mobile communication field has extensively promoted standardization of the $3^{rd}$ generation mobile communication technology (3G: The Third Generation) and established a series of communication system standards such as WCDMA (Wide Code Division Multiple Access), HSDPA (High Speed Downlink Packed Access) and HSUPA (High Speed Uplink Packet Access).

In order to address challenges of the wideband access technique and respond to growing demand for new services, the 3GPP has started standardization of the 3G long-term evolution (LTE) since the end of 2004, planning to improve spectrum efficiency and performance of cell-edge users, reduce system delay and provide a higher-speed access service to high-speed mobile users. The improved LTE (LTE-A) technology provides high-speed and excellent-performance services to more mobile users by multiplying data rate and increasing the frequency bandwidth by several times based on the LTE technology.

In the LTE-A system, a multi-user Multiple-Input Multiple-Output (MU-MIMO) technique is supported. That is, in the LTE-A system, a plurality of user equipments (UEs) can be scheduled simultaneously in same-frequency resources. In other words, in the LTE-A system, plural UEs can share frequency resources such as resource blocks. The UEs sharing same frequency resources may be called one coordinated transmission group participating in the MU-MIMO transmission.

In the MIMO system, in order to improve the spectrum efficiency and power user efficiency, there has been proposed an idea of MIMO precoding. In this MIMO precoding, a transmission side can use channel state information (CSI). In a closed-loop downlink MIMO/coordinated multi-point (CoMP) system, CSI required for precoding can be obtained from an uplink feedback from UE.

In an actual system, CSI is divided into following two parts, that is, channel phase information (for example, precoding Matrix indicator (PMI), channel direction information (CDI) or channel covariance) and channel quality information (for example, channel quality indicator (CQI)).

As illustrated in FIG. 1, a precoding section for performing precoding in a conventional base station includes, as an internal configuration, a precoding matrix determining module 101 configured to determine a precoding matrix to use in precoding in the base station, based on a precoding matrix indicator (PMI) reported from a UE and a codebook stored in the base station, a channel quality determining module 102 configured to determine channel quality information to use in precoding in the base station, based on a channel quality indicator (CQI) reported from the UE and a CQI table stored in the base station, and a precoding module 103 configured to perform precoding on data to transmit to the UE based on the determined precoding matrix and channel quality information.

SUMMARY OF THE INVENTION

Technical Problem

In the LTE-A system supporting the MU-MIMO technique, each UE cannot consider any influence on multi-user interference by precoding matrixes of other UEs in the PMI reporting process. Therefore, channel sate information from each UE obtained by the base station is not accurate one. Therefore, the precoding gain becomes relatively low.

The present invention was carried out in view of the foregoing, and aims to provide a channel reconfiguration method and an apparatus therefor, capable of recognizing a relatively accurate channel state of each UE.

Further, the present invention aims to provide a precoding method and an apparatus therefor, capable of selecting a better precoding method and thereby, improving a precoding gain.

Solution to Problem

One aspect of the present invention is a channel reconfiguration method comprising the steps of: reconfiguring a channel of a UE based on channel phase information and channel quality information reported from the UE to obtain a channel matrix of the UE.

Another aspect of the present invention is a precoding method comprising the steps of: reconfiguring a channel of a UE based on channel quality information and channel phase information reported from the UE to obtain a channel matrix of the UE; and determining a precoding matrix of the UE based on the channel matrix of the UE and performing precoding on data to transmit to the UE using the precoding matrix.

The channel phase information includes channel direction information, and the step of reconfiguring the channel of a UE based on channel phase information and channel quality information reported from the UE includes: determining a channel direction of the channel of the UE based on the channel direction information reported from the UE and a codebook stored in a own station; determining channel quality of the channel of the UE based on a channel quality indicator reported from the UE and a channel quality indicator table stored in the own station; and reconfiguring the channel matrix of the UE based on the determined channel direction and channel quality of the channel of the UE.

The channel phase information includes a precoding matrix indicator, and the step of reconfiguring the channel of a UE based on channel phase information and channel quality information reported from the UE includes: determining a precoding matrix of the UE based on the precoding matrix indicator reported from the UE and a codebook stored in a own station; determining channel quality of the channel of the UE based on a channel quality indicator reported from the UE and a channel quality indicator table stored in the own station; determining a channel direction of the channel of the UE based on the precoding matrix of the UE; and reconfiguring the channel matrix of the UE based on the determined channel direction and channel quality of the channel of the UE.

The above-mentioned method further comprises modifying the channel direction of the channel of the UE based on an optimal codebook in an actual channel environment, and the step of reconfiguring the channel matrix of the UE based on the determined channel direction and channel quality of the channel of the UE includes reconfiguring the channel matrix of the UE based on the modified channel direction and the channel quality of the channel of the UE.

The step of modifying the channel direction of the channel of the UE based on an optimal codebook in an actual channel environment includes calculating in advance a difference vector Δ between the optimal codebook in the channel environment of the own station and the codebook stored in a base station; calculating a sum of the determined channel direction of the channel of the UE and the difference vector Δ; and using the calculated sum as the modified channel direction of the channel of the UE.

The above-mentioned method further comprises modifying the channel direction of the channel of the UE based on time correlation of the channel of the UE, and the step of reconfiguring the channel matrix of the UE based on the determined channel direction and channel quality of the channel of the UE includes: reconfiguring the channel matrix of the UE based on the modified channel direction of the channel of the UE and the channel quality.

The step of modifying the channel direction of the channel of the UE based on time correlation of the channel of the UE includes calculating a weighting sum of the determined channel direction of the channel of the UE and a channel direction of the channel of the UE determined in a last transmission time interval and using the calculated sum as a modified channel direction, and a sum of weighting coefficients used in weighting is equal to 1.

The above-mentioned method further comprises modifying the channel direction of the channel of the UE based on spatial correlation of the channel of the UE, and the step of reconfiguring the channel matrix of the UE based on the determined channel direction and channel quality of the channel of the UE includes reconfiguring the channel matrix of the UE based on the modified channel direction of the channel of the UE and the channel quality.

The step of modifying the channel direction of the channel of the UE based on the spatial correlation of the channel of the UE includes determining a channel sub-space where the channel of the UE exists, based on the determined channel direction of the channel of the UE, selecting a channel direction having a probability density greater than a predetermined threshold in the channel sub-space, and using the selected channel direction as the modified channel direction of the channel of the UE.

Prior to determining the channel quality of the channel of the UE based on the channel quality indicator reported from the UE and the channel quality indicator table stored in the own station, a minimal value among fed-back channel quality indicators or with a weighting value of the minimal value among the fed-back channel quality indicators is embedded at a position where no channel quality indicator is fed back from the UE.

The step of determining a channel direction of the channel of the UE based on the precoding matrix of the UE includes performing conjugate transpose of the precoding matrix of the UE to obtain the channel direction of the channel of the UE.

Another aspect of the present invention is a channel reconfiguration apparatus comprising: a channel direction determining module configured to determine a channel direction of a channel of a UE based on channel direction information reported from the UE and a codebook stored in a own station; a channel quality determining module configured to determine channel quality of the channel of the UE based on a channel quality indicator reported from the UE and a channel quality indicator table stored in the own station; and a channel reconfiguring module configured to reconfigure a channel matrix of the UE based on the determined channel direction and channel quality of the channel of the UE.

Another aspect of the present invention is a precoding apparatus comprising: a channel direction determining module configured to determine a channel direction of a channel of a UE based on channel direction information reported from the UE and a codebook stored in a own station; a channel quality determining module configured to determine channel quality of the channel of the UE based on a channel quality indicator reported from the UE and a channel quality indicator table stored in the own station; a channel reconfiguring module configured to reconfigure a channel matrix of the UE based on the determined channel direction and channel quality of the channel of the UE; a precoding matrix determining module configured to determine a precoding matrix for performing precoding on data to transmit to the UE, based on the channel matrix of the UE; and a precoding module configured to perform precoding on the data to transmit to the UE, using the precoding matrix.

Another aspect of the present invention is a channel reconfiguration apparatus comprising: a channel matrix determining module configured to determine a precoding matrix of a UE based on a precoding matrix indicator reported from the UE and a codebook stored in a own station; a channel quality determining module configured to determine channel quality of the channel of the UE based on a quantized channel quality indicator reported from the UE and a channel quality indicator table stored in the own station; a channel direction determining module configured to determine a channel direction of the channel of the UE based on the precoding matrix of the UE; and a channel reconfiguring module configured to reconfigure a channel matrix of the UE based on the determined channel direction and channel quality of the channel of the UE.

Yet another aspect of the present invention is a precoding apparatus comprising: a channel matrix determining module configured to determine a precoding matrix of a UE based on a precoding matrix indicator reported from the UE and a codebook stored in a own station; a channel quality determining module configured to determine channel quality of the channel of the UE based on a quantized channel quality indicator reported from the UE and a channel quality indicator table stored in the own station; a channel direction determining module configured to determine a channel direction of the channel of the UE based on the precoding matrix of the UE; a channel reconfiguring module configured to reconfigure a channel matrix of the UE based on the determined channel direction and channel quality of the channel of the UE; a precoding matrix determining module configured to determine the precoding matrix for performing precoding on data to transmit to the UE, based on the channel matrix of the UE; and a precoding module configured to perform precoding the data to transmit to the UE, using the precoding matrix.

The above-mentioned apparatus further comprises a channel direction modifying module configured to modify the channel direction of the channel of the UE based on an optimal codebook in an actual channel environment.

The above-mentioned apparatus further comprises a channel direction modifying module configured to modify the channel direction of the channel of the UE based on time correlation of the channel of the UE.

The above-mentioned apparatus further comprises a channel direction modifying module configured to modify the channel direction of the channel of the UE based on spatial correlation of the channel of the UE.

The above-mentioned apparatus further comprises a channel quality modifying module configured to embed a minimal value among fed-back channel quality indicators or with a weighting value of the minimal value among the fed-back channel quality indicators at a position where no channel quality indicator is fed back from the UE.

Technical Advantage of the Invention

According to the present invention, the channel reconfiguration method and the apparatus therefor provided by the present invention make it possible to reconfigure a channel of a UE based on channel phase information and channel quality information reported from the UE. With this invention, it is possible for a base station to know a channel state of the UE relatively accurately.

Besides, the precoding method and the apparatus provided by the present invention make it possible to determine a precoding matrix for a UE based on a channel matrix of the UE obtained by channel reconfiguration and perform precoding on data to transmit to the UE. With this invention, it is possible for a base station to select a better precoding method and thereby to improve a precoding gain.

DESCRIPTION OF EMBODIMENTS

In a conventional LTE-A system that supports the MU-MIMO technique, each UE is not able to consider any influence on multi-user interference by precoding matrixes of other UEs, which causes a problem that channel state information of the UE obtained by the base station is not accurate. In order to solve this problem, the present invention provides a channel reconfiguration method and an apparatus therefor. With this solving means, channel phase information (for example, PMI or CDI) and channel quality information (for example, CQI) reported from the UE are used as a basis to reconfigure a channel of the UE and thereby to obtain a channel matrix of the UE. With this structure, the base station is able to know a channel sate of the UE relatively accurately.

Based on the above-described solving means, the present invention also provides a precoding method and an apparatus therefor. In this solving means, the channel matrix of the UE obtained by the above-mentioned channel reconfiguration solving means is used as a basis to determine a precoding matrix of the UE and this precoding matrix is used as a basis to perform precoding on the data to be transmitted to the UE. In the above-described solving means, the precoding matrix used in precoding by the base station is such as determined based on the reconfigured channel matrix of the UE, and is not such as directly determined based on the PMI and CQI fed back from the UE. Accordingly, the base station is able to select a better precoding method (for example, non-unitary precoding). With this structure, it is possible to improve the precoding gain greatly.

In order to further clarify the objective, solving means and merits of the present invention, the present invention will be described with reference to the drawings, in detail below.

Figure 1:
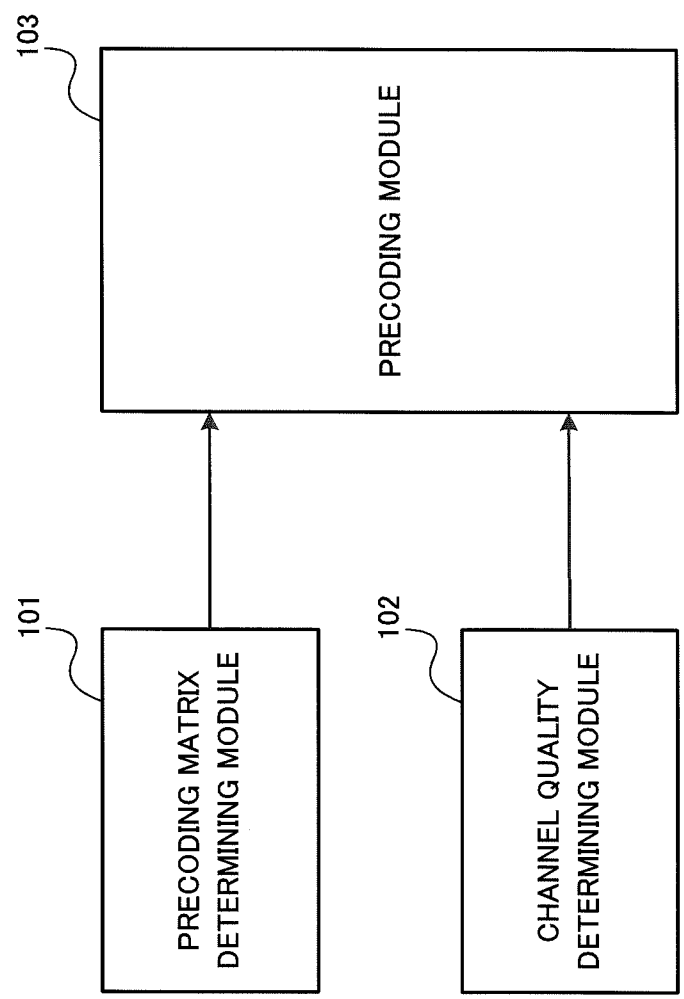
FIG. 1 is a diagram illustrating an inner configuration of a precoding section for performing precoding in a conventional base station.
Figure 2:
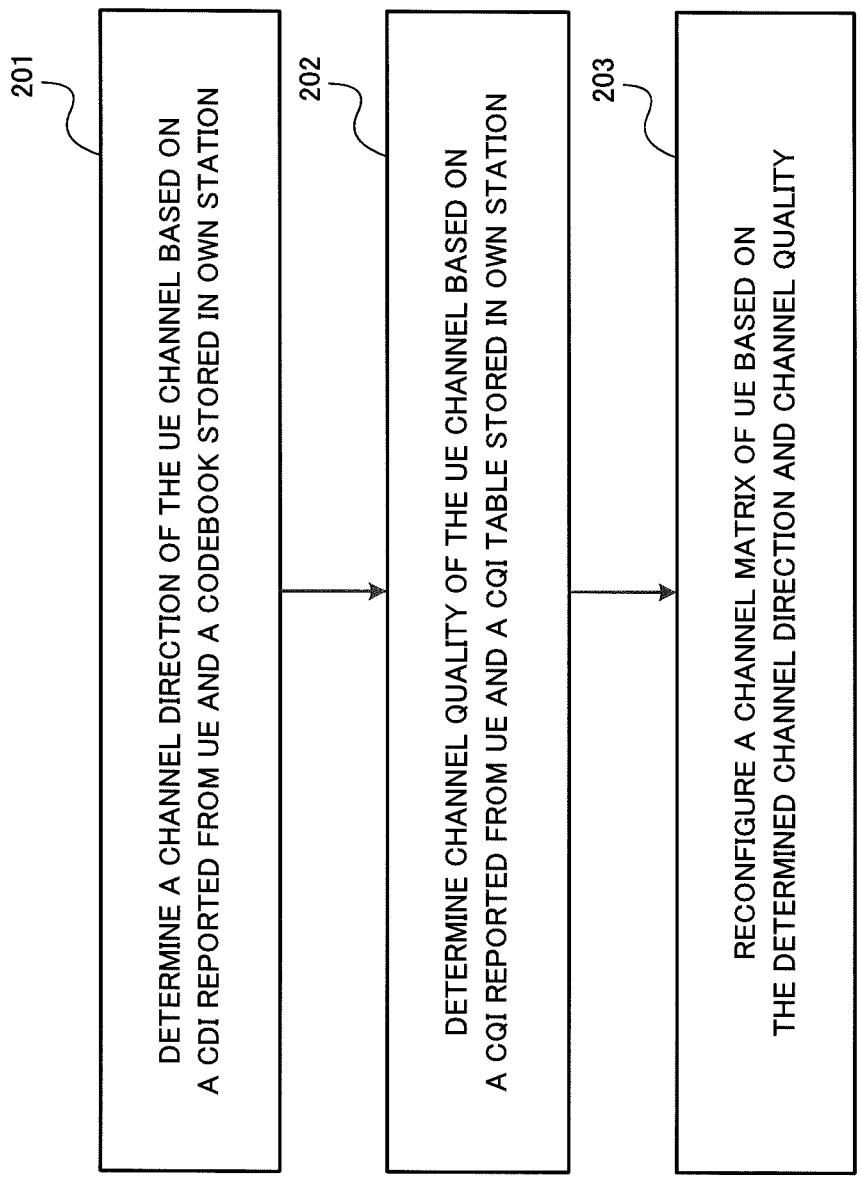
FIG. 2 is a flow chart of a channel reconfiguration method provided according to an embodiment of the present invention.

In an embodiment (solving means 1) of the present invention, it is assumed that a UE is able to feed back a CDI and a CQI directly to a base station. In this case, as illustrated in FIG. 2, the channel reconfiguration method provided in this embodiment includes the following steps.

In the step 201, a channel direction (CD) of the UE channel is determined based on a CDI reported from the UE and a codebook stored in the base station.

In the present invention, the UE and the base station have the same codebook stored therein. Accordingly, the UE performs channel estimation and then, based on a channel estimation result, the UE determines a channel direction of the own station channel. Then, based on the codebook stored in the own station, the UE quantizes the channel direction of the own station channel, and then, determines a CDI to report to the base station. After receiving the CDI reported from the UE, the base station determines the channel direction of the UE channel based on the codebook stored in the base station. That is, the channel direction of the UE channel determined in this step is a quantized channel direction of the UE channel In the step 202, the CQI reported from the UE and the CQI table stored in the base station are used as a basis to determine channel quality of the UE channel. These steps 201 and 202 can be executed in parallel.

In the present invention, the UE and the base station have the same CQI table stored therein. Accordingly, after channel estimation, the UE uses a channel estimation result as a basis to determine channel quality (CQ) of the own station channel and then, quantizes the channel quality of the own station channel based on the CQI table stored in the own station, thereby to determine a CQI to report to the base station. After receiving the CQI reported from the UE, the base station determines channel quality of the UE based on the CQI table stored in the own station. That is, the channel quality of the UE channel determined in this step is quantized channel quality of the UE channel.

In the step 203, the determined channel direction of the UE channel and channel quality are used as a basis to reconfigure a channel matrix of the UE.

In the present invention, the base station reconfigures the channel matrix of the UE by the following expression 1.

$$H' = \text{sqrt}(CQ_i) \cdot CD \qquad \text{[EXPRESSION 1]}$$

where H' represents a reconfigured channel matrix, $CQ_i$ represents channel quality information fed back from a user, CD represents a channel direction determined in the above-mentioned step 202 and sqrt( ) represents a function to seek a root-mean-square.

Once obtaining the channel matrix of the UE, the base station applies the channel matrix of the UE to precoding thereby to be able to accomplish precoding on data to transmit to the UE. In other words, after obtaining the channel matrix of the UE, the base station, then, determines a precoding matrix to perform precoding on data to be transmitted to the UE, based on the channel matrix of the UE, and performs precoding on the data to be transmitted to the UE by using the precoding matrix.

Figure 3:
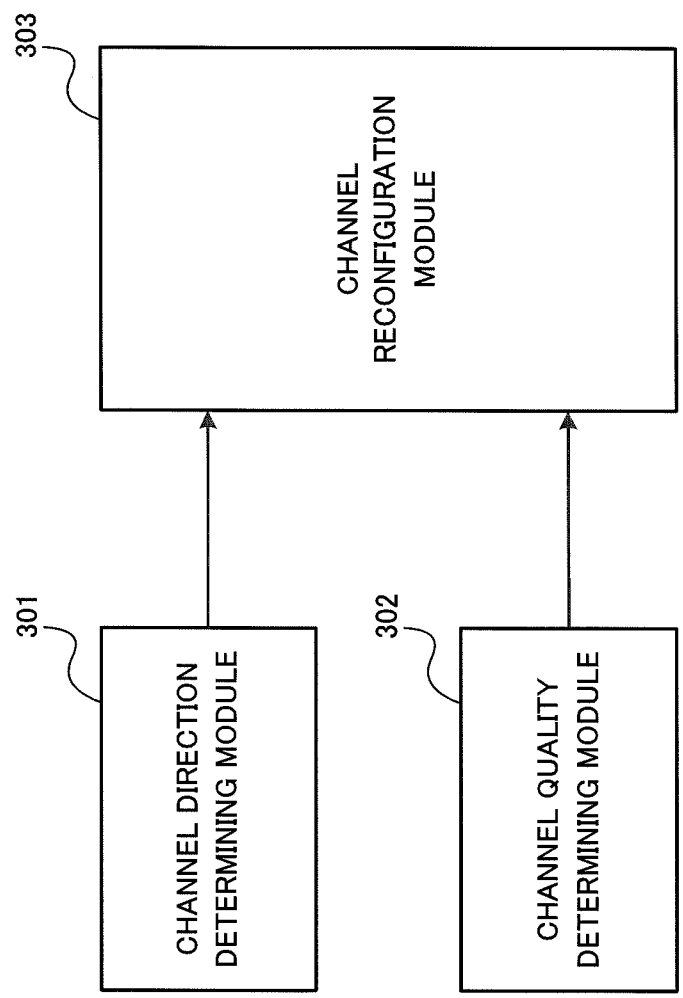
FIG. 3 is a diagram illustrating an inner configuration of a channel reconfiguration apparatus provided according to the embodiment of the present invention.

Corresponding to the above-described channel reconfiguration method, the present embodiment also provides a channel reconfiguration apparatus for performing channel reconfiguration. This apparatus is generally located inside the base station. As illustrated in FIG. 3, the channel reconfiguration apparatus provided in the present embodiment includes, as an inner configuration, a channel direction determining module 301 configured to determine a channel direction of a UE channel based on a CDI reported from the UE and a codebook stored in the base station, a channel quality determining module 302 configured to determine channel quality of the UE channel based on a CQI reported from the UE and a CQI table stored in the base station and a channel reconfiguration module 303 configured to reconfigure a channel matrix of the UE based on the determined channel quality and channel direction of the UE channel.

Specifically, the above-mentioned channel reconfiguration module 303 is able to reconfigure a channel matrix of the UE by the above-mentioned expression 1.

Corresponding to the above-mentioned precoding method, the present embodiment also provides a precoding apparatus. This apparatus includes, in addition to the above-described channel direction determining module 301, channel quality determining module 302 and channel reconfiguration module 303, a precoding matrix determining module configured to determine a precoding matrix to perform precoding on data to be transmitted to the UE based on the channel matrix of the UE, and a precoding module configured to perform precoding on the data to be transmitted to the UE by using the above-mentioned precoding matrix.

As is clear from this embodiment, before performing precoding, the base station uses the CDI and CQI fed back from the UE as a basis to reconfigure a channel of the UE and obtain a channel matrix of the UE channel. Then, based on the channel matrix of the UE obtained by reconfiguration, the base station determines the precoding matrix to perform precoding on the data to be transmitted to the UE, however the base station does not use the PMI and CQI fed back from the UE as they are in determining the precoding matrix. Accordingly, it is possible to realize channel matching precisely and obtain a greater precoding gain.

Figure 4:
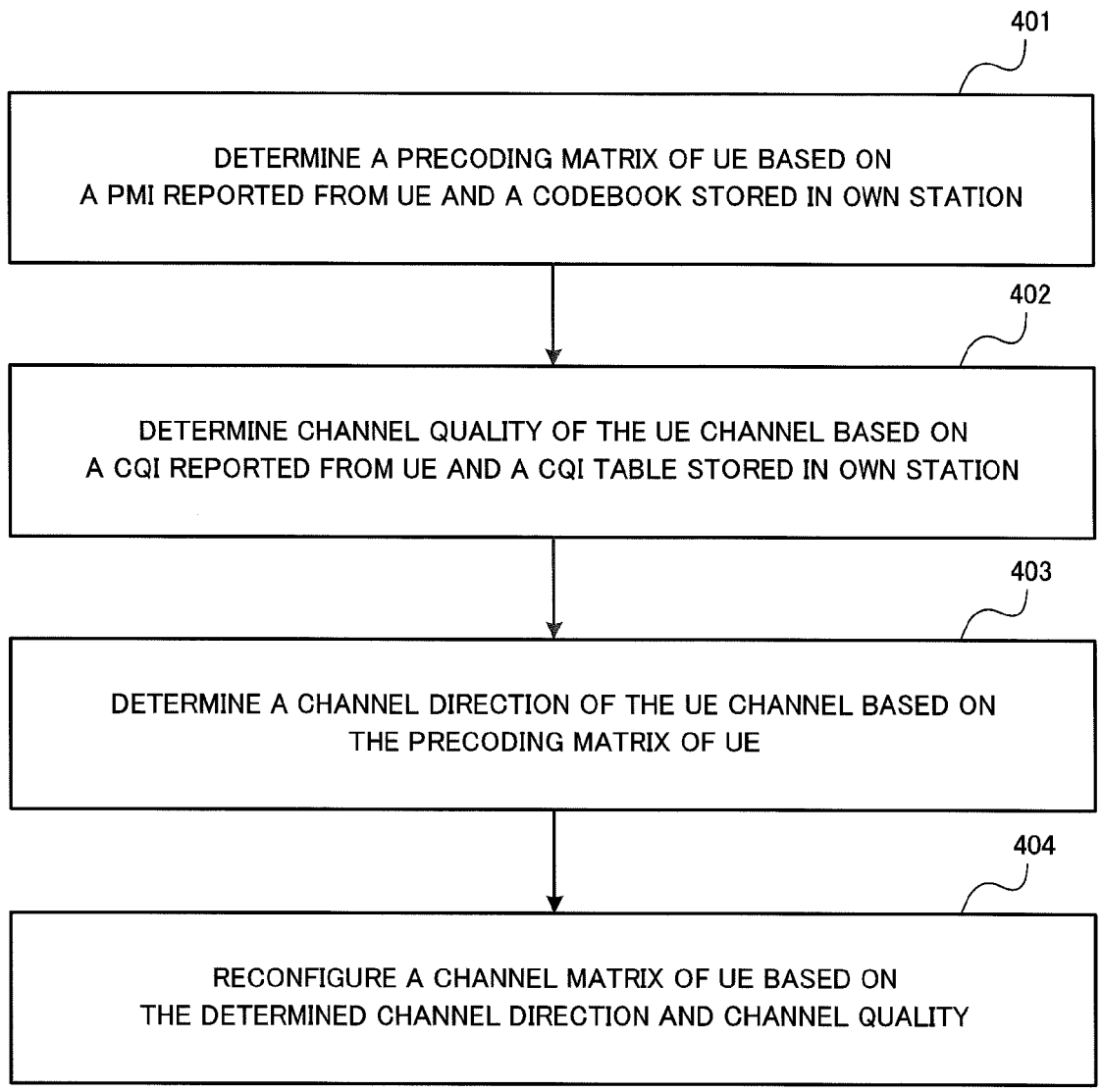
FIG. 4 is a flow chart of a channel reconfiguration method provided according to another embodiment of the present invention.

In another embodiment (solving means 2) of the present invention, it is assumed that a UE feeds back a PMI and a CQI directly to a base station. In this case, as illustrated in FIG. 4, the present embodiment provides a channel reconfiguration method including the following steps.

In the step 401, the PMI reported from the UE and the codebook stored in the UE are used as a basis to determine a precoding matrix (PM) of the UE.

In this embodiment, the UE and the base station have the same codebook stored therein. Accordingly, after performing channel estimation, the UE determines a channel direction of the own station channel by quantizing the precoding matrix of the own station, based on a channel estimation result. Then, based on the codebook stored in the own station, the UE determines a PMI to report to the base station. After receiving the PMI reported from the UE, the base station determines the precoding matrix of the UE channel based on the codebook stored in the base station. That is, the precoding matrix of the UE determined in this step is a precoding matrix.

In the step 402, the CQI reported from the UE and the CQI table stored in the own station are used as a basis to determine channel quality of the UE channel.

In the present invention, the UE and the base station have the same CQI table stored therein. Accordingly, after performing channel estimation, the UE uses a channel estimation result as a basis to quantize the channel quality of the own station channel thereby to determine the channel quality of the own station. Then, based on the CQI table stored in the own station, the UE determines a CQI to report to the base station. After receiving the CQI reported from the UE, the base station uses the CQI table stored in the base station as a basis to determine channel quality of the UE channel. That is, the channel quality of the UE channel determined in this step is quantized channel quality of the UE channel. These steps 401 and 402 may be executed in parallel.

In the step 403, the above-mentioned precoding matrix of the UE is used as a basis to determine a channel direction of the UE channel.

Specifically, in this step, conjugate transpose is obtained on the above-mentioned precoding matrix of the UE thereby to obtain a channel direction of the UE channel.

In the step 404, the determined channel direction and channel quality of the UE channel are used as a basis to reconfigure the channel matrix of the UE. Specifically, this step can be realized by the above-mentioned expression 1.

Likewise, the base station obtains a channel matrix of the UE, and then, applies the channel matrix of the UE to precoding, thereby to accomplish precoding on data to be transmitted to the UE. That is, after obtaining the channel matrix of the UE, the base station further uses the channel matrix of the UE as a basis to determine the precoding matrix to perform precoding on the data to be transmitted to the UE, and then, performs precoding on the data to be transmitted to the UE.

Figure 5:
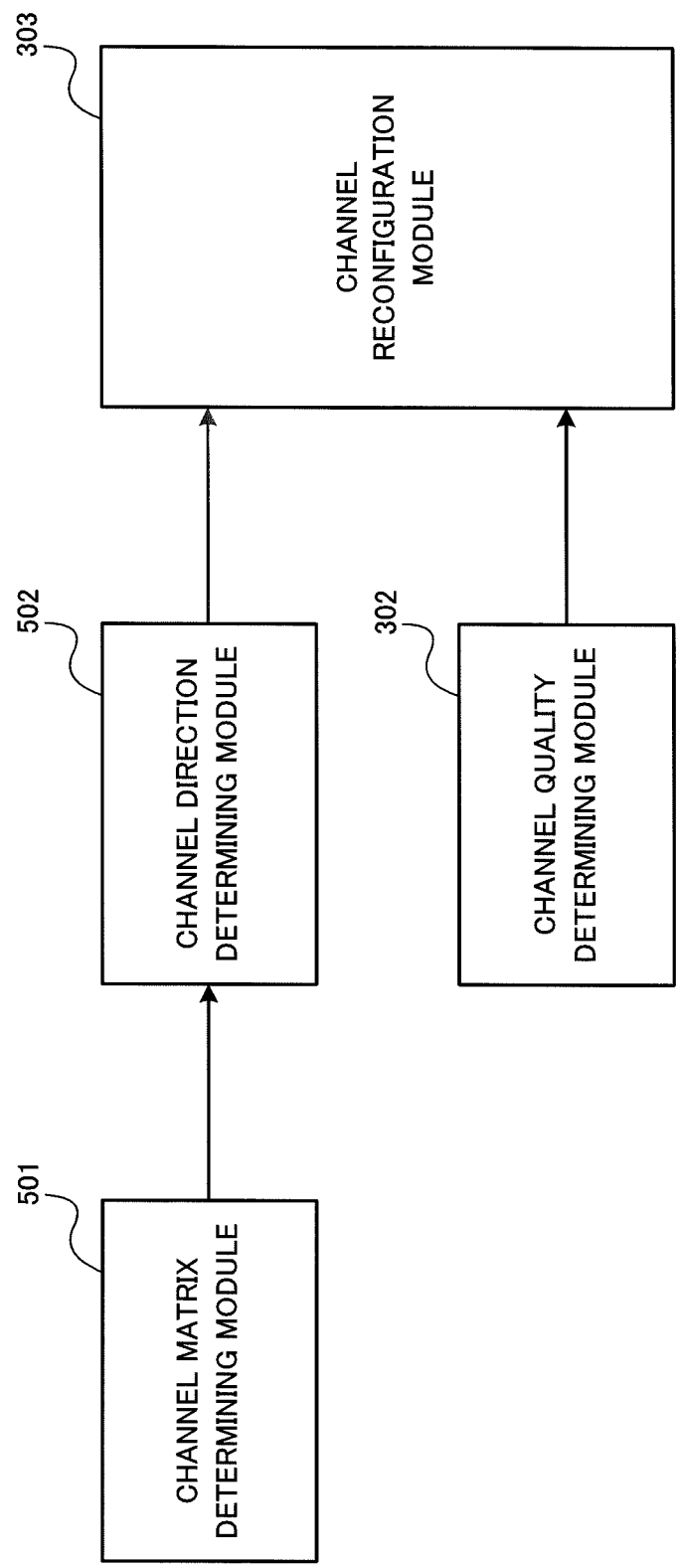
FIG. 5 is a diagram illustrating an inner configuration of a channel reconfiguration apparatus provided according to the other embodiment of the present invention.

Corresponding to the above-described channel reconfiguration method, the present embodiment provides a channel reconfiguration apparatus. As illustrated in FIG. 5, the apparatus mainly includes, as an inner configuration, a channel matrix determining module 501 configured to determine a precoding matrix fed back from the UE based on the PMI reported from the UE and the codebook stored in the base station, a channel quality determining module 302 configured to determine channel quality of the UE channel based on the CQI reported from the UE and the CQI table stored in the base station, a channel direction determining module 502 configured to determine a channel direction of the UE channel and a channel reconfiguration module 303 configured to reconfigure the channel matrix of the UE based on the determined channel quality and channel direction of the UE channel.

Specifically, the above-mentioned channel direction determining module 502 performs conjugate transpose on the precoding matrix fed back from the UE thereby to obtain a channel direction of the UE channel. The above-mentioned channel reconfiguration module 303 can reconfigure the channel matrix of the UE by the above-mentioned expression 1.

Corresponding to the above-described precoding method, the present embodiment provides a precoding apparatus. This apparatus has, in addition to the above-mentioned channel matrix determining module 501, channel direction determining module 502, channel quality determining module 302 and channel reconfiguring module 303, a precoding matrix determining module configured to a precoding matrix to perform precoding on data to be transmitted to the UE, based on the channel matrix of the UE and a precoding module configured to perform precoding on the data to be transmitted to the UE by using the above-mentioned precoding matrix.

As is clear from the present embodiment, prior to precoding, the base station uses the PMI and CQI fed back from the UE as a basis to reconfigure the channel of the UE thereby to obtain a channel matrix of the UE. Then, based on the channel matrix of the UE obtained by reconfiguration, the base station determines the precoding matrix to perform precoding on the data to be transmitted to the UE. Here, the base station does not use the PMI and CQI fed back from the UE as they are in determining the precoding matrix. Accordingly, it is possible to realize channel matching more precisely and achieve a greater precoding gain.

In the above-described solving means 1, the CDI fed back from the UE is not the channel direction of the UE channel as it is, but the quantized channel direction. Accordingly, there is a quantization error between the channel direction of the UE channel determined by the base station based on the CDI reported from the UE and the channel direction of the UE channel obtained by the channel estimation at the UE.

Likewise, in the above-described solving means 2, the PMI reported from the UE is not the precoding matrix of the UE as it is, but the quantized precoding matrix. Accordingly, there is a quantization error between the precoding matrix the UE determined based on the PMI reported from the UE at the base station and the precoding matrix of the UE determined by the channel estimation result at the UE. With this structure, there is a quantization error between the channel matrix of the UE obtained by channel reconfiguration at the base station and the actual channel matrix of the UE.

In order to make the channel matrix of the UE obtained by the channel reconfiguration at the base station more accurate and closer to the actual channel matrix of the UE, the present invention also provides, in addition to the above-described solving means, several optimal methods for modifying the channel direction of the UE channel obtained by the above-described solving means, each of which is described in detail below.

<Method 1>

An optimal codebook in an actual channel environment is used as a basis to modify the channel direction of the UE channel obtained by the above-mentioned solving means.

Specifically, it is known that there exists a unique optimal codebook corresponding to each of actual channel environments and such an optimal codebook for each actual channel environment can be obtained by complete search. For example, for non-correlative MIMO channel, the Grassmannian codebook is the optimal codebook.

However, under the present standards, the optimal codebook is not adopted due to consideration of system complexity and power amplification performance. That is, there seems to be some difference between the optimal codebook in an actual channel environment and the codebook stored by the base station and the UE. Accordingly, in this method, a difference vector Δ between the optimal codebook in the channel environment of the own station and the codebook stored in the base station needs to be further calculated in advance and the following step needs to be executed after the step 201 and before the step 203, or after the step 403 and before the step 404.

In other words, a sum of the above-mentioned difference vector Δ and the determined channel direction of the UE channel is calculated and the calculated sum is used as a modified channel direction. After that, the modified channel direction and channel quality are used as a basis to reconfigure the channel matrix of the UE in the step 203 or 404.

Corresponding to this method, a channel direction modifying module is provided additionally between the channel direction determining module 301 and the channel reconfiguration module 303 of the channel reconfiguration apparatus as illustrated in FIG. 3 or between the channel direction determining module 502 and the channel reconfiguration module 303 of the channel reconfiguration apparatus illustrated in FIG. 5. The channel direction modifying module is configured to modify the channel direction of the UE channel based on an optimization codebook in an actual channel environment. Specifically, a sum of the determined channel direction of the UE channel and the difference vector Δ between the optimization codebook in the actual channel environment calculated in advance and the codebook stored in the base station is obtained and the obtained sum is used as a modified channel direction. In this case, the above-mentioned channel reconfiguration module 303 reconfigures a channel matrix of the UE based on the modified channel direction and channel quality.

In this method, as the channel direction of the UE channel is modified based on the optimization codebook in the actual environment, the modified channel direction of the UE channel can be closer to a channel direction of an optimal channel. With this structure, it is possible to obtain a more accurate channel direction, thereby realizing channel matching more precisely and improving the precoding gain.

<Method 2>

Time correlation of the UE channel is used as a basis to modify a channel direction of the UE channel.

In this method, the channel direction of the UE channel at the current TTI can be modified based on the channel direction of the UE channel determined in the last transmission time interval (TTI). Specifically, when the channel direction of the UE channel determined in the last TTI is expressed by $CD_{TTI1}$ and the channel direction of the UE channel determined at the current TTI is expressed by $CD_{TTI2}$, a modified channel direction $CD_{rev}$ of the UE channel can be calculated by the following expression 2.

$$CD_{rev} = \alpha \times CD_{TTI1} + (1-\alpha\alpha) \times CD_{TTI2} \qquad \text{[EXPRESSION 2]}$$

Where α meets $\alpha \in [0,1]$

That is, the following step needs to be further executed after the above-mentioned step 201 and before the step 203, or after the above-mentioned step 403 and before the step 404. In other words, a weight sum of the determined channel direction of the UE channel and the channel direction of the UE channel determined in the last TTI is calculated, and the calculated sum is used as a modified channel direction. Here, a sum of weighting coefficients to use in weighting equals to 1. Then, at the step 203 or step 404, the modified channel direction and channel quality are used as a basis to reconfigure a channel matrix of the UE.

Corresponding to this method, a channel direction modifying module is provided additionally, between the channel direction determining module 301 and the channel reconfiguration module 303 of the channel reconfiguration apparatus illustrated in FIG. 3 or between the channel direction determining module 502 and the channel reconfiguration module 303 of the channel reconfiguration apparatus illustrated in FIG. 5. The channel direction modifying module is configured to modify the channel direction of the UE channel based on time correlation of the UE channel. Specifically, a weight sum of the determined channel direction of the UE channel and a channel direction of the UE channel determined in one previous TTI is obtained, and the obtained sum is used as a modified channel direction. Here, a sum of weighting coefficients to use in weighting equals to 1. In this case, the above-mentioned channel reconfiguration module 303 reconfigures the channel matrix of the UE based on the modified channel direction and channel quality.

The present method makes it possible to obtain a more accurate channel direction by make full use of time correlation of the UE channel. With this structure, it is possible to realize more accurate channel matching and improve the precoding gain.

<Method 3>

Spatial correlation of the UE channel is used as a basis to modify a channel direction of the UE channel.

In this method, the channel direction of the UE channel may be modified based on a probability density function (PDF) of the channel direction in the channel sub-space where the channel direction of the UE channel exists. For example, such a channel direction that the probability density in the channel sub-space is more than a predetermined threshold is selected and used as a modified channel direction of the UE channel.

In other words, the following step needs to be further executed after the above-mentioned step 201 and before the step 203, or after the above-mentioned step 403 and after the step 404. That is, the determined channel direction of the UE channel is used as a basis to determine a channel sub-space where the UE channel exists, and a channel direction such that the probability density in the channel sub-space is greater than the predetermined threshold is selected and used as a modified channel direction of the UE channel. When there are more than one channel directions such that the probability density in the channel sub-space is greater than the predetermined threshold, any one or a maximum one may be selected and used as a modified channel direction of the UE channel. Then, in the step 203 or step 404, the modified channel direction and channel quality are used as a basis to reconfigure the channel matrix of the UE.

Corresponding to this method, a channel direction modifying module is provided additionally between the channel direction determining module 301 and the channel reconfiguration module 303 of the channel reconfiguration apparatus illustrated in FIG. 3 or between the channel direction determining module 502 and the channel reconfiguration module 303 of the channel reconfiguration apparatus illustrated in FIG. 5. The channel direction modifying module is configured to modify a channel direction of the UE channel based on spatial correlation of the UE channel. Specifically, it determines a channel sub-space where the UE channel exists, based on the determined channel direction of the UE channel, selects a channel direction such that the probability density in the channel sub-space is greater than the predetermined threshold and uses is as a modified channel direction of the UE channel. In this case, the above-mentioned channel reconfiguration module 303 reconfigures the channel matrix of the UE based on the modified channel direction and channel quality.

The present invention makes it possible to achieve a more accurate channel direction by making full use of spatial correlation of the UE channel. With this structure, it is possible to realize channel matching more precisely and improve the precoding gain.

Further, in the above-mentioned step 202 or step 402, it is possible to determine the channel quality of a UE channel based on a CQI reported from the UE and a CQI table stored in the own station by the conventional method. Note that in actual application, there may exist a situation of insufficient CQI feedback. In other words, the number of CQIs fed back from the UE is smaller than the number of CQIs required for the base station to perform precoding. To address this situation, zerofill is typically conducted. That is, the base station fills the position of a CQI that is not fed back from the UE, with zero.

However, the channel quality of the UE obtained by such a zerofill method is not accurate, and therefore, a result of channel reconfiguration is not sufficiently accurate. In order to further optimize the channel reconfiguring method provided by the present invention, it may be possible to modify the channel quality of the UE. As a relatively higher CQI has a higher feedback priority than a relatively lower CQI, a CQI that is not fed back from the UE is generally regarded smaller than CQIs fed back from the UE. Thus, according to the present invention, a minimal value of CQIs that are fed back from the UE is embedded at the position of a CQI that is not fed back from the UE, or a weighting value of the minimal value of CQIs fed back from the UE is embed at the position of a CQI that is not fed back from the UE.

Here, a weighting coefficient adopted here is such as selected based on channel statistical property or statistical property of channel characteristic values. Corresponding to the above-mentioned optimizing method, a channel quality modifying module may be added before the channel quality determining module 302 of the channel reconfiguring apparatus illustrated FIG. 3 or FIG. 5 mentioned above. The channel quality modifying module embeds a minimal value out of CQIs fed back from the UE at the position of a CQI that is not fed back from the UE, or it embeds a weighting value of the minimal value of CQI fed back from the UE at the position of a CQI that is not fed back from the UE. The weighting coefficient adopted here is such as selected based on channel statistical property or statistical property of channel characteristic values.

The above description has been made only of the preferable embodiments of the present invention and is not intended to limit the protective scope of the present invention. It should be noted that various modifications, equivalent replacement and improvements made in the spirit and principle of the present invention fall within the scope of protection the present invention.

The disclosure of Chinese Patent Application No. 201110129623.5, filed on May 16, 2011, including the specification, drawings, and abstract, is incorporated herein by reference in its entirety.

What is claimed is:

1. A channel reconfiguration method comprising the steps of:

reconfiguring a channel of a user equipment (UE) based on channel phase information and channel quality information reported from the UE to obtain a channel matrix of the UE, wherein the channel phase information includes a precoding matrix indicator, and the step of reconfiguring the channel of the UE based on channel phase information and channel quality information reported from the UE includes:

determining a precoding matrix of the UE based on the precoding matrix indicator reported from the UE and a codebook stored in an own station;

determining channel quality of the channel of the UE based on a channel quality indicator reported from the UE and a channel quality indicator table stored in the own station;

determining a channel direction of the channel of the UE based on the precoding matrix of the UE;

modifying the channel direction of the channel of the UE; and reconfiguring the channel matrix of the UE based on the modified channel direction and the channel quality of the channel of the UE, and wherein the step of modifying the channel direction of the channel of the UE comprises one of the following:

(1) calculating in advance a difference vector Δ between an optimal codebook in a channel environment of the own station and a codebook stored in a base station; calculating a sum of the determined channel direction of the channel of the UE and the difference vector Δ; and using the calculated sum as the modified channel direction of the channel of the UE, (2) modifying the channel direction of the channel of the UE based on time correlation of the channel of the UE, and (3) determining a channel sub-space where the channel of the UE exists, based on the determined channel direction of the channel of the UE, selecting a channel direction in the channel subspace, wherein the selected channel direction has a probability density greater than a predetermined threshold, and using the selected channel direction as the modified channel direction of the channel of the UE.

2. The channel reconfiguration method according to claim 1, wherein the step of determining a channel direction of the channel of the UE based on the precoding matrix of the UE includes performing conjugate transpose of the precoding matrix of the UE to obtain the channel direction of the channel of the UE.

3. The channel reconfiguration method according to claim 1, wherein, prior to determining the channel quality of the channel of the UE based on the channel quality indicator reported from the UE and the channel quality indicator table stored in the own station, a minimal value among fed-back channel quality indicators or with a weighting value of the minimal value among the fed-back channel quality indicators is embedded at a position where no channel quality indicator is fed back from the UE.

4. A precoding method comprising the steps of:
reconfiguring a channel of a user equipment (UE) based on channel quality information and channel phase information reported from the UE to obtain a channel matrix of the UE; and
determining a precoding matrix of the UE based on the channel matrix of the UE and performing precoding on data to transmit to the UE, using the precoding matrix,
wherein the channel phase information includes a precoding matrix indicator, and the step of reconfiguring the channel of the UE based on channel phase information and channel quality information reported from the UE includes:
determining the precoding matrix of the UE based on the precoding matrix indicator reported from the UE and a codebook stored in an own station;
determining channel quality of the channel of the UE based on a channel quality indicator reported from the UE and a channel quality indicator table stored in the own station;
determining a channel direction of the channel of the UE based on the precoding matrix of the UE;
modifying the channel direction of the channel of the UE; and
reconfiguring the channel matrix of the UE based on the modified channel direction and the channel quality of the channel of the UE, and
wherein the step of modifying the channel direction of the channel of the UE comprises one of the following:
(1) calculating in advance a difference vector Δ between an optimal codebook in a channel environment of the own station and a codebook stored in a base station; calculating a sum of the determined channel direction of the channel of the UE and the difference vector Δ; and using the calculated sum as the modified channel direction of the channel of the UE, (2) modifying the channel direction of the channel of the UE based on time correlation of the channel of the UE, and (3) determining a channel sub-space where the channel of the UE exists, based on the determined channel direction of the channel of the UE, selecting a channel direction in the channel subspace, wherein the selected channel direction has a probability density greater than a predetermined threshold, and using the selected channel direction as the modified channel direction of the channel of the UE.

5. A channel reconfiguration apparatus comprising:
a channel matrix determining circuit that determines a precoding matrix of a user equipment (UE) based on a precoding matrix indicator reported from the UE and a codebook stored in an own station;
a channel quality determining circuit that determines channel quality of a channel of the UE based on a quantized channel quality indicator reported from the UE and a channel quality indicator table stored in the own station;
a channel direction determining circuit that determines a channel direction of the channel of the UE based on the precoding matrix of the UE;
a channel direction modifying circuit that modifies the channel direction of the channel of the UE; and
a channel reconfiguring circuit that reconfigures a channel matrix of the UE based on the determined channel direction and channel quality of the channel of the UE,
wherein channel phase information includes the precoding matrix indicator, and the channel reconfiguring circuit:
reconfigures the channel of the UE based on channel phase information and channel quality information reported from the UE;
determines the precoding matrix of the UE based on the precoding matrix indicator reported from the UE and the codebook stored in the own station;
determines channel quality of the channel of the UE based on a channel quality indicator reported from the UE and the channel quality indicator table stored in the own station;
determines the channel direction of the channel of the UE based on the precoding matrix of the UE; and
reconfigures the channel matrix of the UE based on the modified channel direction and the channel quality of the channel of the UE; and
wherein the channel direction modifying circuit modifies the channel direction of the channel of the UE by one of the following:
(1) calculating in advance a difference vector Δ between an optimal codebook in a channel environment of the own station and a codebook stored in a base station; calculating a sum of the determined channel direction of the channel of the UE and the difference vector Δ; and using the calculated sum as the modified channel direction of the channel of the UE, (2) modifying the channel direction of the channel of the UE based on time correlation of the channel of the UE, and (3) determining a channel sub-space where the channel of the UE exists, based on the determined channel direction of the channel of the UE, selecting a channel direction in the channel subspace, wherein the selected channel direction has a probability density greater than a predetermined threshold, and using the selected channel direction as the modified channel direction of the channel of the UE.

6. A precoding apparatus comprising:
a channel matrix determining circuit that determines a precoding matrix of a user equipment (UE) based on a precoding matrix indicator reported from the UE and a codebook stored in an own station;
a channel quality determining circuit that determines channel quality of a channel of the UE based on a quantized channel quality indicator reported from the UE and a channel quality indicator table stored in the own station;
a channel direction determining circuit that determines a channel direction of the channel of the UE based on the precoding matrix of the UE;
a channel direction modifying circuit that modifies the channel direction of the channel of the UE;
a channel reconfiguring circuit that reconfigures a channel matrix of the UE based on the determined channel direction and channel quality of the channel of the UE;
a precoding matrix determining circuit that determines the precoding matrix for performing precoding on data to transmit to the UE, based on the channel matrix of the UE; and
a precoding circuit that performs precoding on the data to transmit to the UE, using the precoding matrix,
wherein the channel phase information includes the precoding matrix indicator, and the channel reconfiguring circuit:
reconfigures the channel of the UE based on channel phase information and the channel quality information reported from the UE;
determines the precoding matrix of the UE based on the precoding matrix indicator reported from the UE and the codebook stored in the own station;
determines channel quality of the channel of the UE based on the channel quality indicator reported from the UE and the channel quality indicator table stored in the own station;
determines the channel direction of the channel of the UE based on the precoding matrix of the UE; and
reconfigures the channel matrix of the UE based on the modified channel direction and channel quality of the channel of the UE; and
wherein the channel direction modifying circuit modifies the channel direction of the channel of the UE by one of the following:
(1) calculating in advance a difference vector $\Delta$ between an optimal codebook in a channel environment of the own station and a codebook stored in a base station; calculating a sum of the determined channel direction of the channel of the UE and the difference vector $\Delta$; and using the calculated sum as the modified channel direction of the channel of the UE,
(2) modifying the channel direction of the channel of the UE based on time correlation of the channel of the UE, and
(3) determining a channel sub-space where the channel of the UE exists, based on the determined channel direction of the channel of the UE, selecting a channel direction in the channel subspace, wherein the selected channel direction has a probability density greater than a predetermined threshold, and using the selected channel direction as the modified channel direction of the channel of the UE.

7. The channel reconfiguration apparatus according to claim 5, further comprising
a channel quality modifying circuit that embeds a minimal value among fed-back channel quality indicators or with a weighting value of the minimal value among the fed-back channel quality indicators at a position where no channel quality indicator is fed back from the UE.

* * * * *